(12) United States Patent
Macken (10) Patent No.: US 7,236,333 B2
(45) Date of Patent: Jun. 26, 2007

(54) DOMAIN WALL FREE SHIELDS OF MR SENSORS

(75) Inventor: Declan Macken, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 551 days.

(21) Appl. No.: 10/733,545

(22) Filed: Dec. 11, 2003

(65) Prior Publication Data

US 2005/0128647 A1  Jun. 16, 2005

(51) Int. Cl.
*G11B 5/33* (2006.01)
(52) U.S. Cl. ..................................... 360/319
(58) Field of Classification Search .................. None
See application file for complete search history.

(56) References Cited

U.S. PATENT DOCUMENTS

| | | | |
|---|---|---|---|
| 5,208,715 A * | 5/1993 | Mowry ....................... 360/319 |
| 5,515,221 A | 5/1996 | Gill et al. |
| 5,621,592 A | 4/1997 | Gill et al. |
| 5,808,843 A * | 9/1998 | Kobayashi et al. .... 360/327.31 |
| 6,018,443 A | 1/2000 | Watanabe et al. |
| 6,157,525 A * | 12/2000 | Iwasaki et al. ........ 360/324.12 |
| 6,404,601 B1 | 6/2002 | Rottmayer et al. |
| 6,430,009 B1 | 8/2002 | Komaki et al. |
| 6,437,949 B1 | 8/2002 | Macken |
| 6,456,467 B1 | 9/2002 | Mao et al. |
| 6,500,570 B2 * | 12/2002 | Hasegawa et al. ....... 428/811.2 |
| 7,016,165 B2 * | 3/2006 | Chien et al. ........... 360/324.12 |
| 2002/0008945 A1 | 1/2002 | Mack et al. |
| 2002/0044390 A1 | 4/2002 | Narumi et al. |
| 2002/0064002 A1 | 5/2002 | Gill |
| 2002/0126423 A1 | 9/2002 | Terunuma et al. |
| 2002/0141119 A1 | 10/2002 | Saito |
| 2002/0167768 A1 | 11/2002 | Fontana et al. |
| 2002/0171982 A1 | 11/2002 | Lairson et al. |
| 2002/0181164 A1 | 12/2002 | Macken et al. |
| 2002/0191353 A1 * | 12/2002 | Sato ........................... 360/322 |
| 2003/0086215 A1 | 5/2003 | Kief et al. |
| 2006/0158793 A1 * | 7/2006 | Arasawa et al. ........ 360/324.12 |

* cited by examiner

*Primary Examiner*—Allen Cao
(74) *Attorney, Agent, or Firm*—Kinney & Lange, P.A.

(57) ABSTRACT

A magnetic reader of the present invention comprises an MR sensor shielded by a magnetic shield including single domain soft magnetic materials. The domain wall free magnetic shield includes an unbiased soft magnetic layer and a biased soft magnetic layer separated by a non-magnetic layer. The easy axis of the biased layer is oriented to create a path for magnetic flux through the biased and unbiased layers thereby reducing the demagnetization field of the shield. A biasing layer maintains the first and second magnetic layers as single domain magnets. The biasing layer is further shaped to define a quiet zone where the biasing layer does not overlay the MR sensor.

15 Claims, 7 Drawing Sheets

DOMAIN WALL FREE SHIELDS OF MR SENSORS

BACKGROUND OF THE INVENTION

The present invention relates generally to shields for magnetoresistive sensors used in electronic data storage and retrieval systems. In particular, this invention relates to biased domain wall free shields. The present invention is a further improvement on U.S. Pat. No. 6,437,949, herein incorporated by reference.

In an electronic data storage and retrieval system, a transducing head typically includes a reader portion having a magnetoresistive (MR) sensor for retrieving magnetically encoded information stored on a magnetic disc. MR sensors are comprised of at least one magnetic layer whose magnetic alignment responds to external applied magnetic fields. Typical MR sensors are of the anisotropic magnetoresistive (AMR) sensor or giant magnetoresistive (GMR) sensor type. When an MR sensor is passed over the surface of a magnetic storage disc, magnetic flux from the surface of the disc alters the magnetic alignment of the MR sensor, which in turn alters the magnetic resistivity of the MR sensor. The change in resistivity of the MR sensor can be detected by passing a current through the MR sensor and measuring a voltage across the MR sensor. External circuitry then converts the voltage information into an appropriate format and manipulates that information as necessary.

A response curve of the MR sensor compares the voltage across the MR sensor to the magnetic flux received from the disc by the sensor. This response curve has both linear and non-linear portions, of which it is preferred that the MR sensor operate along the linear portion. To force the MR sensor to operate along the linear portions, the sensor is magnetically biased at a biasing point that is located along the linear portion of the response curve.

MR sensors have a large read pulse width that must be reduced for high linear densities. The pulse width of the MR sensor is reduced by sandwiching the MR sensor between two magnetic shields. The magnetic shields generally incorporate soft magnetic materials for their permeability to magnetic flux. The purpose of the shields is to prevent the magnetic flux from sources other than the desired transition from interacting with the MR sensor. During a read operation, the upper and lower shields ensure that the MR sensor reads only the information (transition) stored directly beneath it on a specific track of the magnetic disc medium by absorbing any stray magnetic fields emanating from adjacent tracks and transitions.

Within a conventional shield exists a plurality of magnetic domains separated from each other by a plurality of magnetic domain walls. Each domain has a magnetization that is oriented in a direction different than the magnetization of all adjacent domains. As the domain walls move, the bias point, as well as the response of the MR sensor to signals emanating from the magnetic disc medium changes. The overall result is noise during the read operation.

To avoid the problems associated with domain wall movement, the ideal shield structure would have no domain walls. Attempts to achieve a single domain structure in MR sensor shields have been largely unsuccessful due to inability of weak exchange coupling interactions to overcome large demagnetizing fields in conventional structures. The result is multiple domains, noise and suppression of sensor signal. Consequently, there remains a need in the art for a domain wall free shield without suppressing MR sensor amplitude while reducing or eliminating sources of noise.

BRIEF SUMMARY OF THE INVENTION

The present invention is a thin film structure with soft magnetic portions maintained in a single domain state for use as a shield for an MR sensor. The thin film structure of the present invention has an unbiased soft magnetic layer, a biased soft magnetic layer, a non-magnetic layer and a biasing layer. The non-magnetic layer is positioned between the unbiased soft magnetic layer and the biased soft magnetic layer. The biasing layer is positioned adjacent the biased soft magnetic layer. The biasing layer is further shaped to reduce the effects of transmitted dispersion on the MR sensor while maintaining exchange coupling in areas where the demagnetization field is greatest.

The layered thin film structure of the present invention effectively reduces the demagnetization field to levels where exchange coupling maintains the biased soft magnetic layer as a single domain. The unbiased soft magnetic layer is maintained in a single domain by forming a flux path with the biased soft magnetic layer.

DETAILED DESCRIPTION

Figure 1:
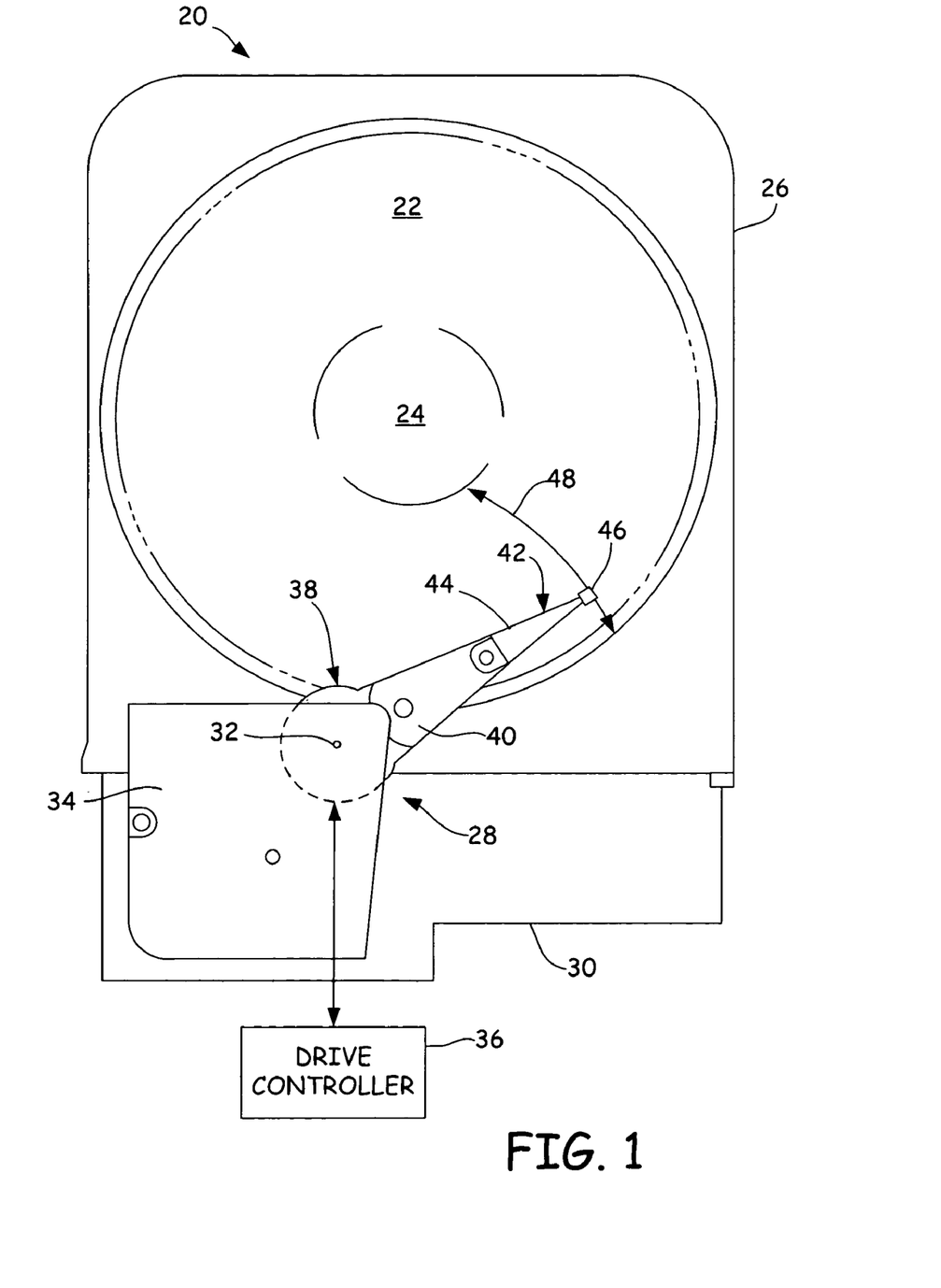
FIG. 1 is a top view of a disc drive system including a transducing head in accord with the present invention.

FIG. 1 illustrates the major components of a disc drive system 20 in which the domain wall free shield of the present invention is used. Disc drive system 20 includes magnetic disc 22 mounted for rotational movement about an axis defined by spindle 24 within housing 26. Disc drive 20 also includes actuator 28 mounted to base plate 30 of housing 26 and pivotally movable relative to disc 22 about axis 32. Cover 34 covers a portion of actuator 28. Drive controller 36 is coupled to actuator 28. Drive controller 36 is either mountable within disc drive system 20 or is located outside of disc drive system 20 with suitable connection to actuator 28. Actuator 28 includes actuator arm assembly 38, a rigid support member 40, and head gimbal assembly 42. Head gimbal assembly 42 includes flexure arm 44 coupled to rigid member 40 and air bearing slider 46 coupled to flexure arm 44 by a gimbal. Slider 46 supports a magnetoresistive (MR) transducing head for reading information from disc 22 and encoding information to disc 22. The domain wall free shields of this invention are part of the MR transducer located within slider 46.

During operation, drive controller 36 receives position information indicating a portion of disc 22 to be accessed. Drive controller 36 receives the position information from either an operator, a host computer, or from another suitable controller. Based on the position information, drive controller 36 provides a position signal to actuator 28. The position signal causes actuator 28 to pivot about axis 32. This causes slider 46 to move radially over the surface of disc 22 in a generally arc-like path indicated by arrow 48. Drive controller 36 and actuator 28 operate in a known closed loop, negative feedback manner so that the transducer carried by slider 46 is positioned over the desired portion of disc 22. Once the transducer is appropriately positioned, drive controller 36 then executes a desired read or write operation.

Figure 2:
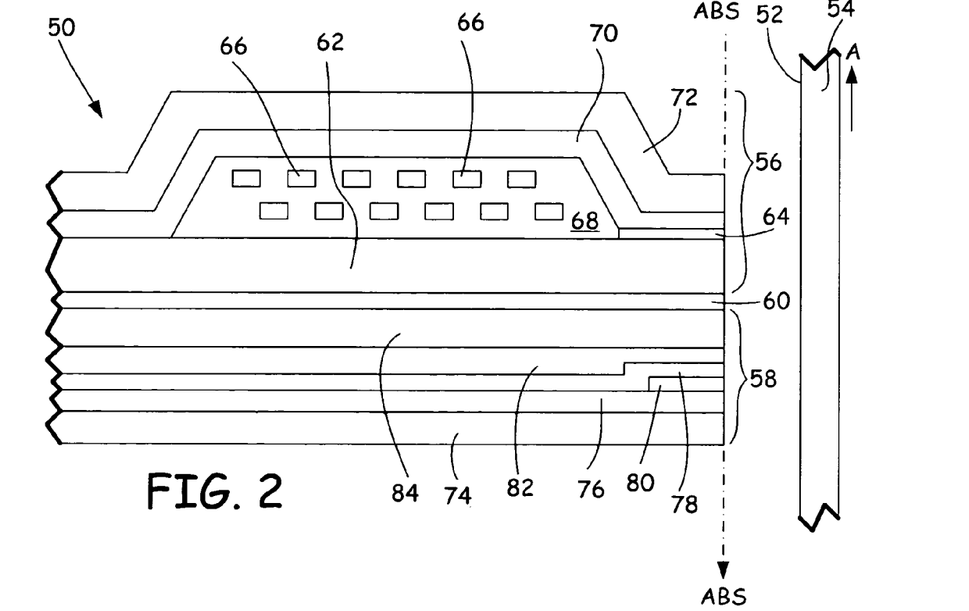
FIG. 2 is a cross-sectional view of a transducing head taken along a plane normal to the air bearing surface.
Figure 3:
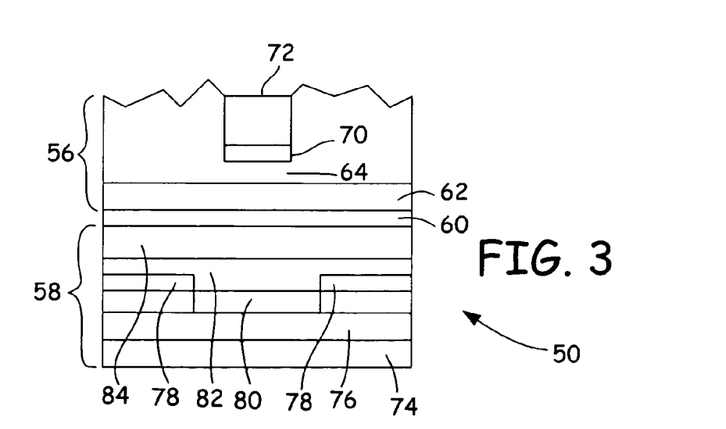
FIG. 3 is a layered diagram that illustrates the location of a plurality of magnetically significant elements of the transducing head of FIG. 2 as they appear along the ABS of the transducing head.

FIGS. 2 and 3 illustrate transducing head 50. FIG. 2 is a cross-sectional view of transducing head 50 taken along a plane normal to air bearing surface (ABS). FIG. 3 is a layered diagram that illustrates the location of a plurality of magnetically significant elements of transducing head 50 as they appear along the ABS. The ABS of transducing head 50 faces disc surface 52 of magnetic disc 54. Magnetic disc 54 travels or rotates in a direction relative to transducing head 50 as indicated by arrow A. Spacing between the ABS of the transducing head 50 and disc surface 52 is preferably minimized while avoiding contact between transducing head 50 and magnetic disc 54.

Transducing head 50 includes writer portion 56 and reader portion 58. The writer portion 56 and reader portion 58 and are presented in a merged configuration with an intermediate spacer layer 60.

Writer portion 56 of transducing head 50 includes bottom pole 62, write gap layer 64, conductive coils 66, insulator layer 68, top pole seed layer 70, and top pole 72. A write gap is defined at the ABS by write gap layer 64 between terminating ends of bottom pole 62 and top pole 72. Conductive coils 66 are positioned in insulator layer 68 between bottom pole 62 and top pole 72, such that the flow of electrical current through conductive coils 66 generates a magnetic field across the write gap.

Reader portion 58 of transducing head 50 includes: lower shield 74, first gap layer 76, contact layer 78, magnetoresistive (MR) sensor 80, second gap layer 82, and upper shield 84. A read gap is defined on the ABS between terminating ends of lower shield 74 and upper shield 84. MR read element 80 is positioned between terminating ends of first gap layer 76 and second gap layer 82. First and second gap layers 76 and 82 are positioned between lower shield 74 and upper shield 84. Lower shield 74 and upper shield 84 may be layered upon separate seed layers (not shown). The seed layers are selected to promote the desired magnetic properties in lower shield 74 and upper shield 84.

MR sensor 80 is a multilayer device operable to sense magnetic flux from a magnetic media. MR sensor 80 may be any one of a plurality of MR-type sensors, including, but not limited to, AMR, GMR, TMR, spin-valve and spin-dependent tunnel junction (STJ) sensors. At least one layer of MR sensor 80 is a sensing layer that requires longitudinal biasing, such as a free layer of a GMR spin-valve sensor. The sensing layer is typically within a reader stack and may also be referred to as the active region of MR sensor 80. Moreover, for several types of MR sensors, at least one layer of MR sensor 80 is an antiferromagnetic layer that requires annealing to set a magnetization direction therein.

Magnetic flux from the surface 52 of disc 54 causes rotation of the magnetization vector of a sensing layer of MR sensor 80, which in turn causes a change in electrical resistivity of MR sensor 80. The change in resistivity of MR sensor 80 can be detected, for example, by passing a current through MR sensor 80 and measuring a voltage across MR sensor 80. External circuitry then converts the voltage information into an appropriate format and manipulates that information as necessary.

During a read operation, lower shield 74 and upper shield 84 ensure that MR sensor 80 reads only the information stored directly beneath it on a specific track of magnetic disc 54. Stray magnetic flux emanating from adjacent tracks and transitions are absorbed by soft magnetic materials within lower shield 74 and upper shield 84.

Lower shield 74 and upper shield 84 are preferably formed of a lamination of thin films including soft magnetic materials which are maintained in single magnetic domain states. By maintaining the soft magnetic materials in single magnetic domain states, the problems associated with domain wall movement are avoided. A shield of the present invention is a further improvement of the thin film structure with soft magnetic portions maintained in a single domain state described in U.S. Pat. No. 6,437,949, herein incorporated by reference. The layered thin film structure of the present invention effectively reduces the demagnetization field to levels where exchange coupling maintains adjacent soft magnetic material as a single domain.

Figure 4:
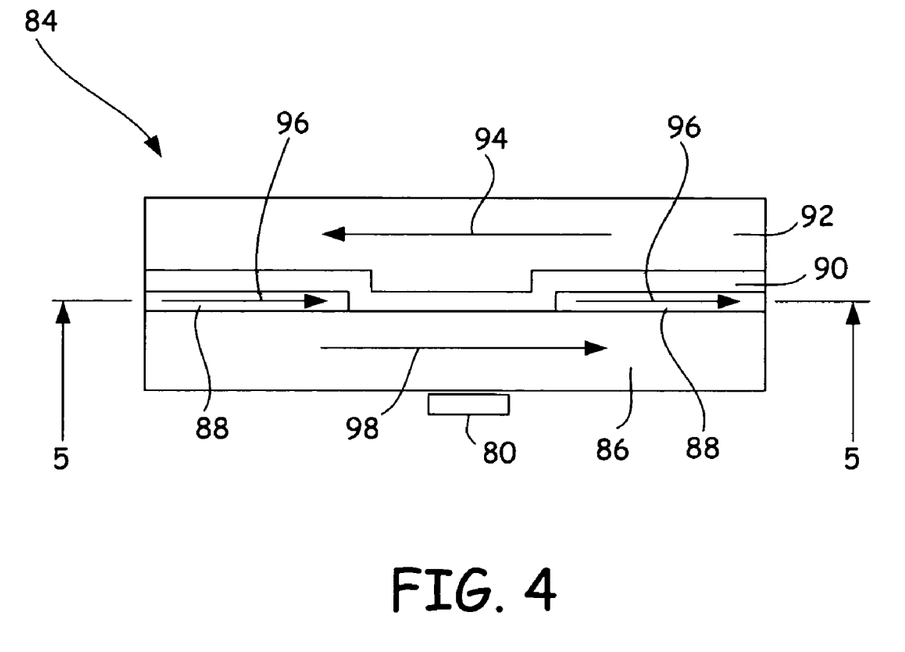
FIG. 4 is a layered diagram of a domain wall free shield of the present invention as viewed along the ABS of a transducing head.
Figure 5:
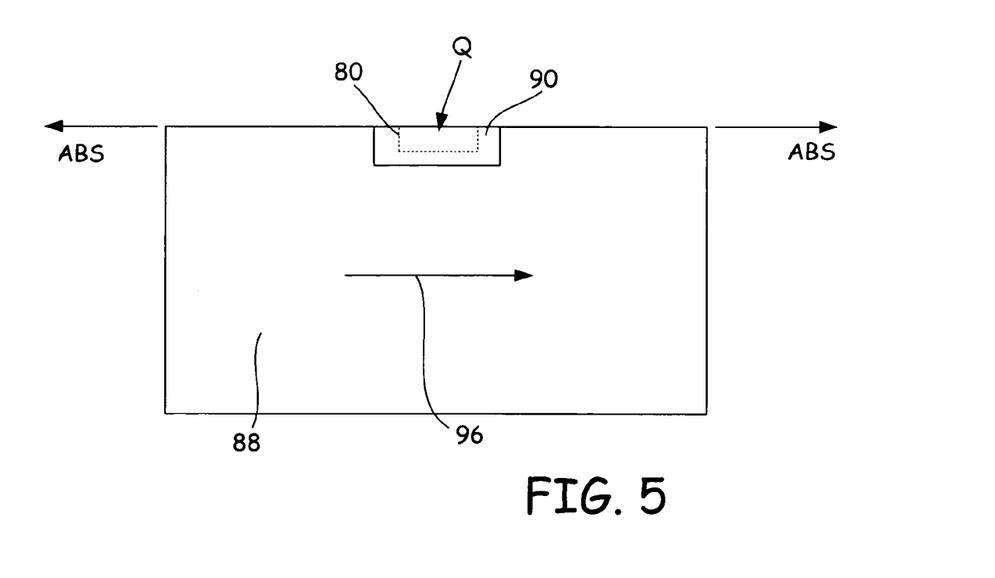
FIG. 5 is a cross-sectional view of a first embodiment of a biasing layer of the domain wall free shield as viewed along line 5-5 of FIG. 4.
Figure 6:
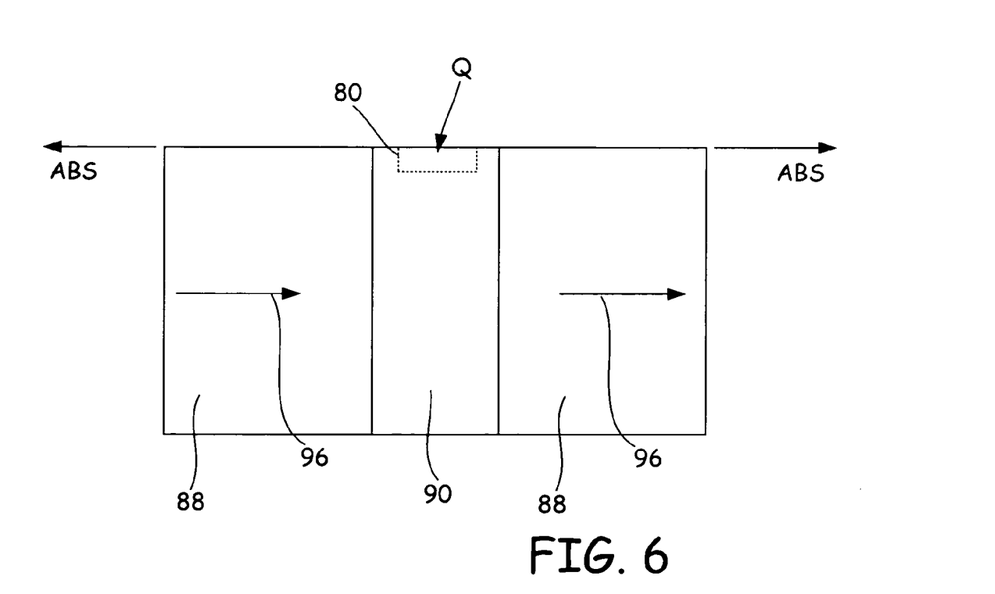
FIG. 6 is a cross-sectional view of a second embodiment of a biasing layer of the domain wall free shield as viewed along line 5-5 of FIG. 4.

Upper shield 84 of the present invention is shown relative to MR sensor 80 in FIGS. 4, 5 and 6. FIG. 4 is a layered diagram of shield 84 as viewed from the air bearing surface. FIG. 5 and FIG. 6 are cross-sectional views of two embodiments of shield 84 taken along line 5-5 of FIG. 4. Upper shield 84 is formed of a lamination of materials in accord with the present invention. Upper shield 84 is comprised of unbiased layer 92, non-magnetic layer 90, biasing layer 88, and biased layer 86. MR sensor 80 is preferably placed adjacent biased layer 86 of shield 84.

Biased layer 86 and unbiased layer 92 are preferably formed of a soft magnetic material having anisotropic properties, such as NiFe, cobalt amorphous alloys, FeN, permalloy or Sendust. In a preferred embodiment, a product of a thickness of biased layer 86 and a magnetic moment of biased layer 86 preferably equals a product of a thickness of unbiased layer 92 and a magnetic moment of unbiased layer 92. Additionally, an easy axis of unbiased layer 92 is preferably parallel to an easy axis of biased layer 86. A net magnetic moment of unbiased layer 92 is indicated by arrow 94 and a net magnetic moment for biased layer 86 is indicated by arrow 98.

Non-magnetic layer 90 is preferably a pinhole free thin (approximately 300 ANG.) layer of a nonmagnetic material, such as: tantalum, chromium, alumina, or silica. Nonmagnetic layer 90, which is positioned between unbiased layer 92 and biasing layer 88 prevents exchange coupling between unbiased layer 92 and biasing layer 88. Thus, a magnetization of unbiased layer 92, depicted by arrow 94, is oriented antiparallel to the magnetization of biased layer 86, depicted by arrow 98, due to demagnetization fields from biased layer 86.

Non-magnetic layer 90 has a dramatic effect on reducing demagnetization fields within shield 84, thereby allowing shield 84 to operate in a single magnetic domain state. Furthermore, this multi-layer lamination of shield 84 allows for the magnetizations of biased layer 86 and unbiased layer 92 to each be saturated along respective easy axes while leaving virtually unaffected the coherent rotation of magnetizations of hard axes of respective biased layer 86 and unbiased layer 92. This feature allows the shield to operate by absorbing stray magnetic flux from adjacent bits or tracks on the magnetic disc by a process of coherent rotation.

Biasing layer 88 is located adjacent to unbiased layer 92, such that biasing layer 88 is positioned between non-magnetic layer 90 and biased layer 86. Biasing layer 88 is preferably formed of either a permanent magnet material (e.g., a hard magnetic material), such as CoPt, CoCrPt, CoCrTa and CoPdCr, or an antiferromagnetic material, such as NiMn, NiMnCr, PtMn, PdPtMn, CrMnPt, CrMnCu, CrMnPd and PtRuMn. Biasing layer 88 is oriented with a net magnetic moment represented by arrows 96. Biasing layer 88 is exchange coupled with biased layer 86 to bias or set magnetization of biased layer 86.

FIGS. 5 and 6 are cross-sectional views of two embodiments of biasing layer 88. Each view is taken along line 5-5 of FIG. 4 with the relative location of MR sensor 80 shown by a dashed outline. Biasing layer 88 is shaped such that non-magnetic layer 90 lies over the position of MR sensor 80.

Biasing layer 88 is shaped to create a void or cut-out adjacent to the MR sensor 80 thereby creating a quiet zone Q proximal to MR sensor 80. Quiet zone Q corresponds to a gap in the hard magnetic biasing layer in the area near MR sensor 80. The size and shape of quiet zone Q is generally related to the size and shape of MR sensor 80. The minimum size of quiet zone Q is the size and shape of the active region of MR sensor 80. The upper size limit of quiet zone Q is set by the size of the shield and the need for sufficient area of biasing layer 888 to maintain the desired domain structure in adjacent biased layer 86. Preferably the width of the quiet zone Q is sufficiently wide that biasing layer 88 does not overlay the area above the MR sensor 80.

One embodiment of quiet zone Q is a void in biasing layer 88 preferably slightly larger than the size and shape of MR sensor 80 as shown in FIG. 5. Typically, the distance between the area overlaying MR Sensor 80 and edges of biasing layer 88 defining the boundary of quiet zone Q is between approximately 1 to 6 microns. However, the distance may be greater in one dimension as demonstrated in an alternative embodiment shown in FIG. 6, In FIG. 6, quiet zone Q is a void roughly the width of MR sensor 80 and extends through biasing layer 88.

Quiet zone Q reduces transmitted dispersion affecting MR sensor 80 and reduces detrimental effects of the biasing layer 88 on MR sensor amplitude and sensitivity. Permanent magnetic materials have transmitted dispersion attributed to variation in the magnetic moments within the permanent magnetic materials. Transmitted dispersion may extend from the permanent magnetic materials into adjacent soft magnetic materials; thereby creating a source of noise to the MR sensor. By shaping the biasing layer 88, the biasing field is maintained at the edges of shield 84 parallel to the ABS where the demagnetization field is greatest; while creating a quiet zone adjacent to MR sensor 80 without noise caused by transmitted dispersion or Barkhausen effects. The size and shape of quiet zone Q may be adjusted to balance the interests of maintaining a sufficient biasing field versus MR sensor sensitivity and transmitted dispersion. Enlarging quiet zone Q reduces the effects of transmitted dispersion on the MR sensor; while decreasing the size of quiet zone Q improves biasing.

Figure 7:
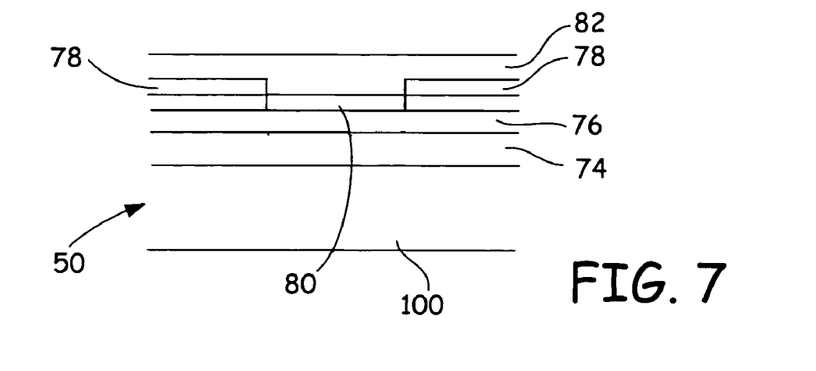
FIGS. 7-12 illustrate fabrication steps for a domain wall free shield.

FIGS. 7-13 illustrate a method of forming a transducing head 50 with a domain wall free upper shield. FIG. 7 shows a partially formed transducing head 50 on a substrate 100. MR sensor 80 and associated structures including: first gap layer 76, contact layer 78, and second gap layer 82, have been deposited. Some structures are omitted from subsequent figures. The formation of upper shield 84 onto the structure of FIG. 7 is described below.

Figure 8:
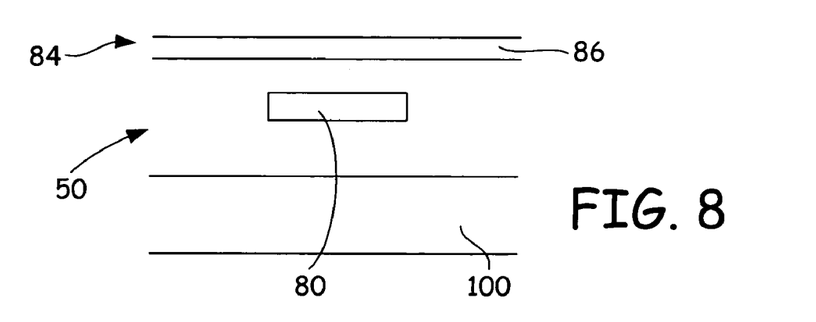
Figure 9:
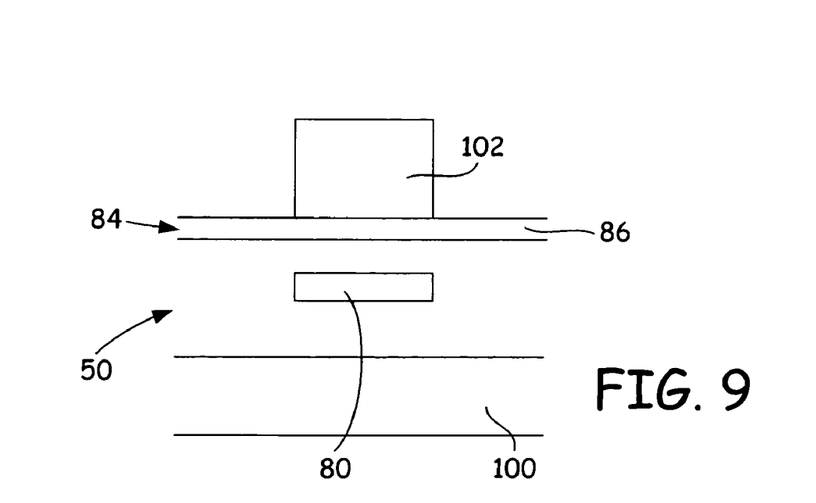
Figure 10:
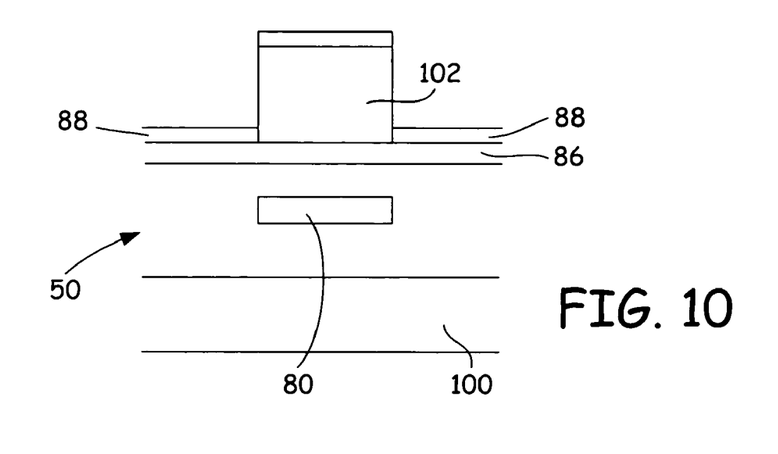
Figure 11:
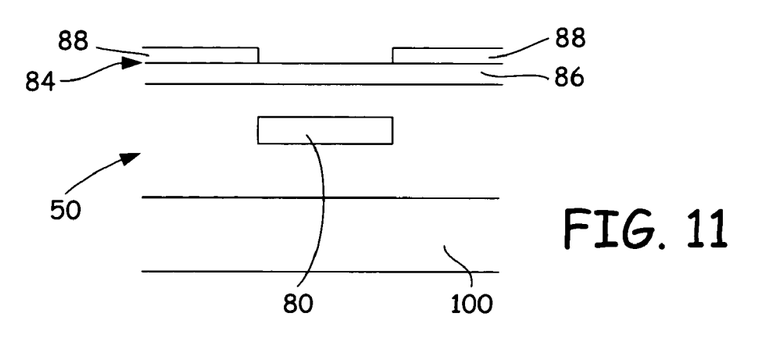

FIG. 8 shows the soft magnetic material deposited to create biased layer 86. FIG. 9 shows a following step in which a portion of biased layer 86 is masked off by photoresist 102. Photoresist 102 generally lies over an area relative to MR sensor 80. FIG. 10 shows the next step, in which hard magnetic material is deposited to form biasing layer 88.

Figure 12:
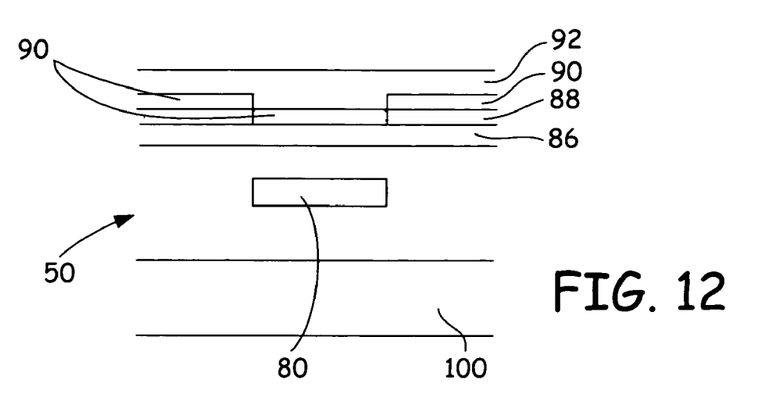

For upper shield 84, a separate seed layer for biasing layer 88 is not present because direct contact between biased layer 86 and biasing layer 88 is desired. Photoresist 102 is subsequently removed resulting in the structure of FIG. 11. Non-magnetic layer 90 is deposited, followed by additional soft magnetic material to form unbiased layer 92 as shown in FIG. 12. Additional layers, including insulating layers, may be subsequently deposited on upper shield 84 to complete transducing head 50 as shown in FIGS. 2 and 3.

In a preferred embodiment, the hard bias material forming biasing layer 88 is obliquely deposited. Oblique deposition induces a preferred axis of anisotropy in the hard magnetic film thereby reducing the transmitted dispersion in the biasing layer 88. The preferred axis of anisotropy in the hard magnetic film is formed without application of the setting field, although a setting field may be additionally applied.

Figure 13:
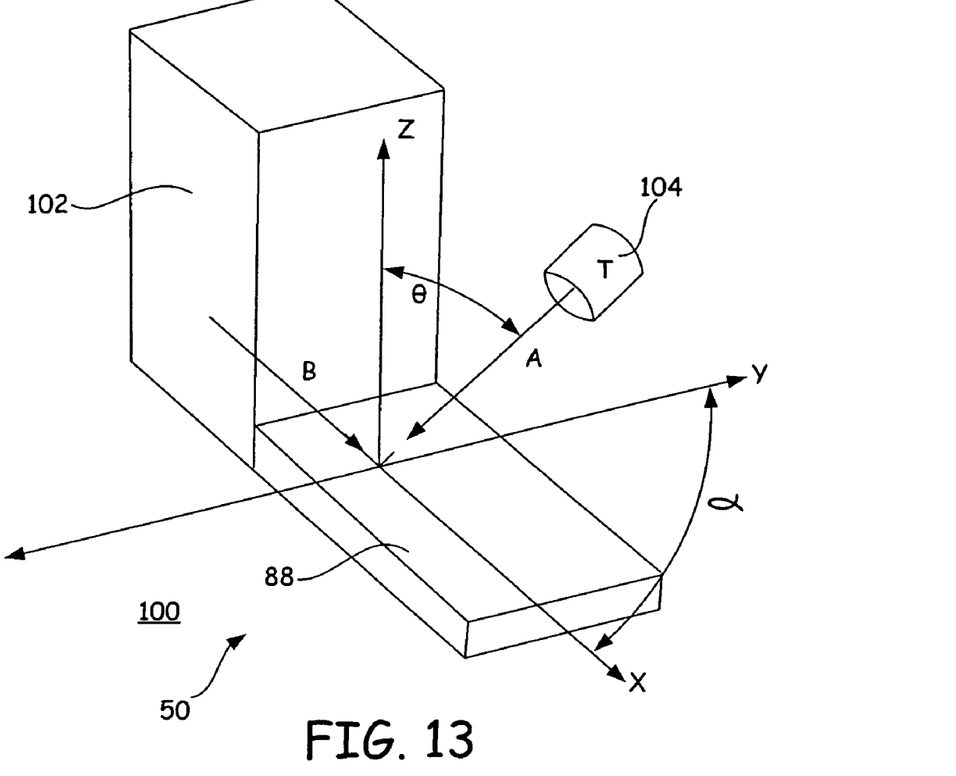
FIG. 13 is a perspective view of oblique deposition of a domain wall free shield.

Oblique deposition to biasing layer 88 is shown in FIG. 13. The angle of oblique deposition $\theta$ is measured from a surface normal. A surface normal is shown in FIG. 13 as the Z axis of the reference Cartesian coordinate axes. The oblique angle of incidence $\theta$ measured from a surface normal is preferably approximately 60° up to approximately 90°, more preferably 65° to 75° with approximately 70° being most preferred. During oblique deposition, substrate 100 is preferably non-rotating for deposition from a point source 104. Point source 104 is preferably a physical vapor deposition (PVD) source, such as an ion beam sputter deposition source. Alternatively, a collimating device may be used to limit the incidence angles of deposition flux to the desired range of oblique angles.

Selection of the proper orientation of incidence of the deposition flux which form the magnetic film is required to direct anisotropy of the grains/magnetic domains in a preferred direction, for example along the ABS direction. Therefore, in addition to the oblique angle, the deposition direction as shown by arrow A is preferably normal to the preferred anisotropy direction. In FIG. 13, the preferred anisotropy direction is parallel to the ABS direction (X axis), therefore deposition is directed at angle $\alpha$, approximately 90° from the X axis. Angle $\alpha$ may be varied or wobbled by approximately ±10° from normal to compensate for any shadowing that may be caused by photoresist 102, the structure of which may vary according to the shield and transducing head design as well as the fabrication methods used.

Due to the nature of physical deposition techniques, the deposited material tends to be thicker nearer the source 104. To compensate, a first layer of hard bias material is deposited according to position A. A second layer is subsequently deposited at the same angle $\theta$, but from the opposite side, approximately 180° relative to angle $\alpha$ in the X-Y plane as shown by position B in FIG. 13. Deposition is alternated between position A and position B until the hard bias material has reached the desired thickness. A setting field is applied to the hard bias materials.

Figure 14:
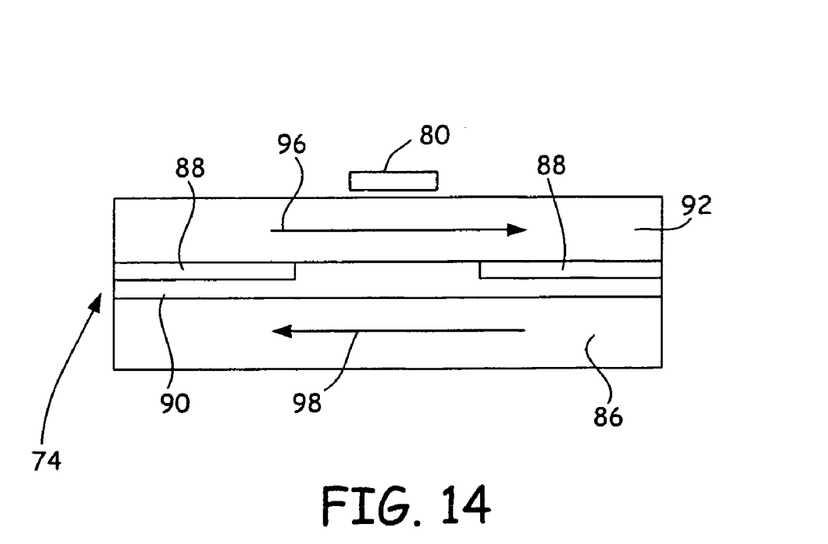
FIG. 14 is a layered diagram of a second example domain wall free shield of the present invention as viewed along the ABS of a transducing head.

FIG. 14 is a bottom view of lower shield 74 of the present invention as viewed from the air bearing surface. FIG. 14 is a layered diagram of shield 74 shown relative to MR sensor 80. Lower shield 74 formed of a lamination of materials consistent with that described for upper shield 84. Lower shield 74 is comprised of unbiased layer 92, a non-magnetic layer 90, a biasing layer 88, and a biased layer 86. Lower shield 74 includes two embodiments for biasing layer 88. Biasing layer 88 is cut-away or shaped for lower shield 74 as described above for upper shield 84.

Lower shield 74 is formed by materials and methods similar to that described above for upper shield 84. However, the shield structure is reversed such that MR sensor 80 is preferably located adjacent biased layer 86 of lower shield 74. Therefore the order of layer deposition for lower shield 74 is reversed from the description given above for upper shield 84. Due to the reversed deposition order, biasing layer 88 is not deposited onto biased layer 86 as in upper shield 84, therefore a seedlayer for biasing layer 88 may be included in lower shield 74.

A seedlayer suitable for hard magnetic material may be deposited prior to biasing layer 88 in lower shield 74. The seedlayer (not shown) is deposited on non-magnetic layer 90 and may be deposited by normal deposition techniques or oblique deposition at an angle θ similar to biasing layer 88.

Alternatively, non-magnetic layer 90 may act as a seedlayer. Suitable, materials for non-magnetic layer 90 when acting as a seedlayer for subsequently deposited biasing layer 88 include Cr, TiW or other non-magnetic materials known in the art for hard bias seedlayers.

Preferably, lower shield 74 and upper shield 84 are both used in transducing head 50. When lower shield 74 and upper shield 84 are used together, biasing layer 90 of each shield preferably shares a common or aligned magnetization. Alternatively, either lower shield 74 or upper shield 84 may be replaced in transducing head 50 by a conventional shield structure.

In summary, the shield structure of the present invention has an unbiased soft magnetic layer, a biased soft magnetic layer, a non-magnetic layer and a biasing layer. The non-magnetic layer is positioned between the unbiased soft magnetic layer and the biased soft magnetic layer creating a flux path to reduce the demagnetizing field. The biasing layer is positioned to exchange couple with the biased soft magnetic layer. The unbiased soft magnetic layer is maintained in a single domain by forming a flux path with the biased soft magnetic layer. The biasing layer is further shaped to reduce the effects of transmitted dispersion on the MR sensor while maintaining exchange coupling in areas where the demagnetization field is greatest.

Transducing head 50 including either first example shield 74 or second example shield 74 may alternatively be fabricated by oblique deposition described herein or by using known methods of material deposition and patterning known to those of skill in the art. Although the present invention has been described with reference to preferred embodiments, workers skilled in the art will recognize that changes may be made in form and detail without departing from the spirit and scope of the invention.

The invention claimed is:

1. A magnetic reader comprising:
   an MR sensor;
   a domain wall free magnetic shield, further comprising:
   first and second magnetic layers;
   a non-magnetic layer separating the first and second magnetic layers; and
   a biasing layer to maintain the first magnetic layer as a single domain, wherein the biasing layer additionally defines a quiet zone.

2. The magnetic reader of claim 1 wherein in the quiet zone the biasing layer does not overlay the MR sensor.

3. The magnetic reader of claim 2 wherein the biasing layer is additionally spaced from the MR sensor.

4. The magnetic reader of claim 1 wherein the biasing layer is shaped so as to define a void in the biasing layer at the quiet zone.

5. The magnetic reader of claim 4 wherein the void in the biasing layer at the quiet zone is a void approximately corresponding to the size and shape of the MR sensor.

6. The magnetic reader of claim 4 wherein the void in the biasing layer at the quiet zone is a void roughly the width of the MR sensor extending through the biasing layer.

7. The magnetic reader of claim 1 wherein the biasing layer is a hard magnetic material.

8. The magnetic reader of claim 7 wherein the hard magnetic material is selected from the group consisting of: CoPt, CoCrPt, CoCrTa and CoPdCr.

9. The magnetic reader of claim 1 wherein the biasing layer is an antiferromagnetic material.

10. The magnetic reader of claim 9 wherein the antiferromagnetic layer is selected from the group consisting of: NiMn, NiMnCr, PtMn, PdPtMn, CrMnPt, CrMnCu, CrMnPd and PtRuMn.

11. The magnetic reader of claim 1 wherein the first and second magnetic layers are formed from one or more soft magnetic materials selected from the group consisting of: NiFe, cobalt amorphous alloys, FeN, permalloy and sendust.

12. The magnetic reader of claim 1 wherein a product of a thickness of first magnetic layer and a magnetic moment of first magnetic layer approximately equals a product of a thickness of second magnetic layer and a magnetic moment of the second magnetic layer.

13. The magnetic reader of claim 1 wherein an easy axis of the first magnetic layer is preferably parallel to an easy axis of the second magnetic layer.

14. The magnetic reader of claim 1 wherein a magnetization of the second magnetic layer is oriented antiparallel to a magnetization of the first magnetic layer due to demagnetization fields.

15. The magnetic reader of claim 1 wherein the biasing layer is oblique deposited.

* * * * *